(12) United States Patent
Kong

(10) Patent No.: US 11,817,812 B1
(45) Date of Patent: Nov. 14, 2023

(54) ELECTRICAL GENERATING SYSTEM

(71) Applicant: Carl Cheung Tung Kong, Los Angeles, CA (US)

(72) Inventor: Carl Cheung Tung Kong, Los Angeles, CA (US)

( * ) Notice: Subject to any disclaimer, the term of this patent is extended or adjusted under 35 U.S.C. 154(b) by 0 days.

(21) Appl. No.: 18/211,734

(22) Filed: Jun. 20, 2023

(51) Int. Cl.
*H02P 9/02* (2006.01)
*H02K 7/00* (2006.01)
*H02K 7/02* (2006.01)
*H02J 7/14* (2006.01)
*H02K 7/116* (2006.01)

(52) U.S. Cl.
CPC .............. *H02P 9/02* (2013.01); *H02J 7/1423* (2013.01); *H02K 7/003* (2013.01); *H02K 7/02* (2013.01); *H02K 7/116* (2013.01)

(58) Field of Classification Search
CPC .......... H02P 9/02; H02J 7/1423; H02K 7/003; H02K 7/02; H02K 7/116
See application file for complete search history.

(56) References Cited

U.S. PATENT DOCUMENTS

| | | | |
|---|---|---|---|
| 6,998,723 B2 | 2/2006 | Kong et al. | |
| 10,644,513 B2* | 5/2020 | Rozman | H02P 9/02 |
| 2020/0130511 A1* | 4/2020 | Botts | H01M 4/485 |
| 2021/0237615 A1* | 8/2021 | Long | G01R 19/16542 |

* cited by examiner

*Primary Examiner* — Jared Fureman
*Assistant Examiner* — Duc M Pham
(74) *Attorney, Agent, or Firm* — Kelly & Kelley, LLP

(57) ABSTRACT

An electrical generating system includes an electrical generator having a plurality of motors operably interconnected with one another. An electrical input source includes one or more sets of batteries. One or more controllers are in electrical connection with the electrical generator and the electrical input power source.

21 Claims, 6 Drawing Sheets

US 11,817,812 B1

ELECTRICAL GENERATING SYSTEM

BACKGROUND OF THE INVENTION

The present invention generally relates to the generation of electricity. More particularly, the present invention relates to an electrical generating system utilizing an arrangement of a plurality of motors for generating electricity.

Electrical generating systems are useful in a number of applications. Such electrical generating systems can comprise hydroelectric turbines, wind-powered generating devices, solar panel arrays, or fossil fuel powered electrical generators. The electricity generated from such electrical generating systems can be used for a myriad of uses. Such uses are increasing as the world becomes increasingly electrified, including the use of electric vehicles.

Accordingly, there is a need for an electrical generating system for producing electricity. The present invention fulfills these needs, and provides other related advantages.

SUMMARY OF THE INVENTION

The present invention is directed to an electrical generating system. The electrical generating system may be used to power a variety of electric devices or even incorporated into such electrical devices, including an electrical vehicle.

The electrical generating system of the present invention generally comprises an electrical generator comprising a first motor electrically coupled to at least one of a chain of motors The first motor has a shaft rotatably coupled to a shaft of an end motor of the chain of motors. The chain of motors comprises a plurality of motors electrically coupled in series to one another and having adjacent shafts interconnected to one another. The shaft in the first motor may be coupled to a shaft of the end motor by a belt or chain. A flywheel assembly may be disposed between adjacent motors of the chain of motors. The flywheel assembly may comprise a first plate attached to a shaft of a motor and a second plate attached to a shaft of an adjacent motor, the first and second plates being interconnected to one another. A first set of motors of the chain of motors may be operably connected to a second set of motors of the chain of motors by a gear assembly.

A first controller has an output in electrical connection with the first motor and at least one of the motors of the chain of motors. A second controller is also provided and may be electrically connected to the first controller.

An electrical input power source comprises a first set of plurality of batteries electrically coupled to one another in series. The electrical power source is electrically coupled to an input of the first controller. An electrical device is electrically coupled to an output of the electrical generator.

The electrical input power source may comprise a second set of batteries. At least one switch may be coupled to an output of the electrical generator for selectively directing power to recharge the first or second set of batteries.

An inverter may be used to convert the DC power generated by the electrical generator into AC power for use by the electrical device. A capacitor may be used to store power generated by the electrical generator.

The electrical device may comprise an electric car motor. The second controller is electrically coupled to the electric car motor.

The electric car motor may be coupled to an interconnected plate assembly having a first sprocket of a first diameter coupled thereto, a second sprocket of a second diameter greater than the diameter of the first sprocket being coupled to the first sprocket and a rotatable crankshaft having offset counterweights extending therefrom. The crankshaft may be operably coupled to a flywheel-clutch assembly that imparts rotating force to at least one wheel of a car.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to an electrical generating system. The electrical generating system may be used to power one or more electrical devices, including an electric vehicle.

Figure 1:
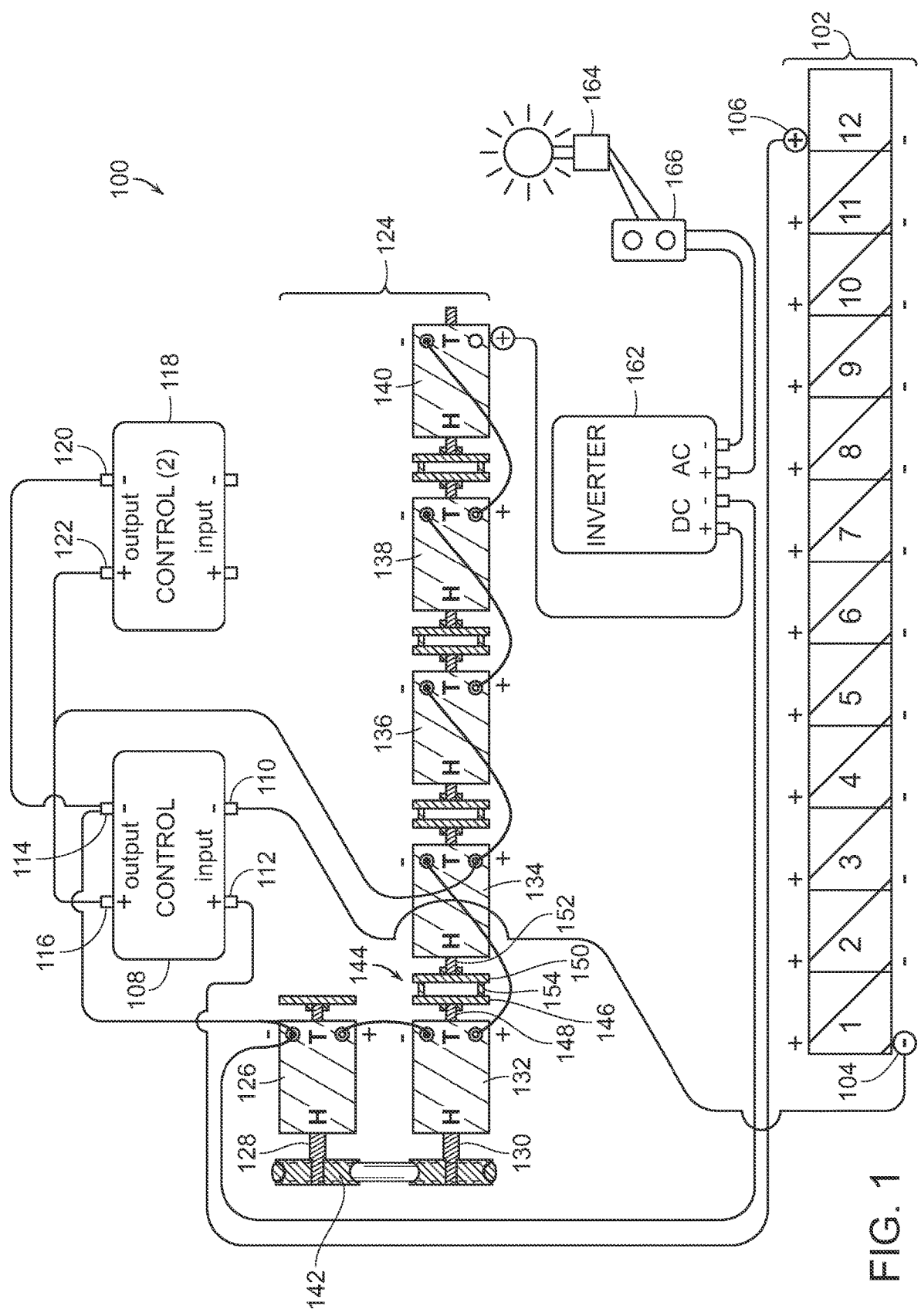
FIG. 1 is a diagrammatic view of an electrical generating system embodying the present invention.

With reference to FIG. 1, the electrical generating system, generally referred to by the reference number 100, has an electrical input power source, typically comprising a first set of a plurality of batteries 102. The batteries 102, as illustrated in FIG. 1, are electrically coupled to one another in series. Twelve batteries are shown electrically interconnected to one another with leads to form the first set of batteries 102, although it will be appreciated that the number of batteries can vary. The positive terminal of one battery is electrically connected to the negative terminal of an adjacent battery so as to connect the batteries 102 in an electrical series.

The negative terminal 104 and positive terminal 106 of the end batteries in the set of batteries 102, or the net cumulative voltage or charge of the set of batteries 102 is connected to a first controller 108. More particularly, negative terminal 104 is interconnected with negative terminal 110 of the controller and positive terminal 106 of the battery set 102 is connected to positive input 112 of the controller 108. As will be more fully explained below, the first controller 108 has outputs 114 and 116 which are electrically coupled to an electrical generator of the system 100. A second controller 118 may be in electrical communication with the first controller 108, such as by leads extending from outputs 120 and 122. The second controller 118 can assist the first controller 108 in operating the electrical generator.

The use of the second controller 118 in conjunction with the first controller 108 is believed to reduce the current amps used to run the motors of the electrical generator.

The electrical generator 124, as illustrated in FIG. 1, is comprised of an arrangement of a plurality of interconnected motors. A first motor, which may be characterized as a driving motor 126, is electrically coupled to the first controller 108. More particularly, negative output 114 of the controller 108 is electrically coupled to a negative terminal of the first motor 126. A shaft 128 of the first motor 126, extending from the head H of the first motor 126 is rotatably coupled to a shaft 130 of an end motor 132 of a chain of motors 132-140. Although the chain of motors 132-140 is shown as being five interconnected motors, it will be appreciated that the number of motors interconnected to one another can vary. Shaft 130 extends from the head H of end motor 132. Shafts 128 and 130 are coupled to one another, such as by a belt or chain 142 or by flywheel. Thus the head ends H of motors 126 and 132 are interconnected with one another. Motor 126 and motor 132 are electrically connected to one another, such as the positive terminal of motor 126 being connected to the negative terminal of motor 132, as illustrated.

The motors within the chain of motors 132-140 are also electrically coupled to one another, such as in series. As illustrated, the positive terminal 116 of output controller 108 is electrically coupled to the positive terminal of motor 134. The positive terminal of motor 132 is electrically coupled to the negative terminal of adjacent motor 134. Similarly, the positive terminal of motor 134 is electrically coupled to the negative terminal of adjacent motor 136. The positive terminal of motor 136 is electrically coupled to the negative terminal of adjacent motor 138, etc. Moreover, the controller 108 is electrically coupled to at least one motor of the chain of motors 132-140, in the illustrated embodiment in FIG. 1 the positive output terminal 116 of controller 108 being electrically coupled to the positive terminal of motor 134, which is an intermediate motor of the chain of motors 132-140.

As illustrated, the motors of the chain of motors 132-140 are physically interconnected to one another as well. The tail T end of motor 132 is coupled to the head H end of motor 134. This head H to tail T end of adjacent motors is continued throughout the chain of motors 132-140. More particularly, the shafts extending from the tail T and head H of the adjacent motors are interconnected to one another. This is typically accomplished by a flywheel assembly 144 disposed between adjacent motors of the chain of motors 132-140. The flywheel assembly 144 comprises a first plate 146 attached to a shaft 148 of a motor, such as the tail shaft 148 of motor 132, and a second plate 150 attached to a shaft 152 of an adjacent motor, in the illustrated embodiment the head shaft 152 of motor 134. The first and second plates 146 and 150 are interconnected to one another, such as by one or more bolts 154 or the like. A similar flywheel assembly is disposed between adjacent motors of the remainder of the motors of the chain of motors, where the tail T and head H shafts of the motors are interconnected to one another.

Figure 2:
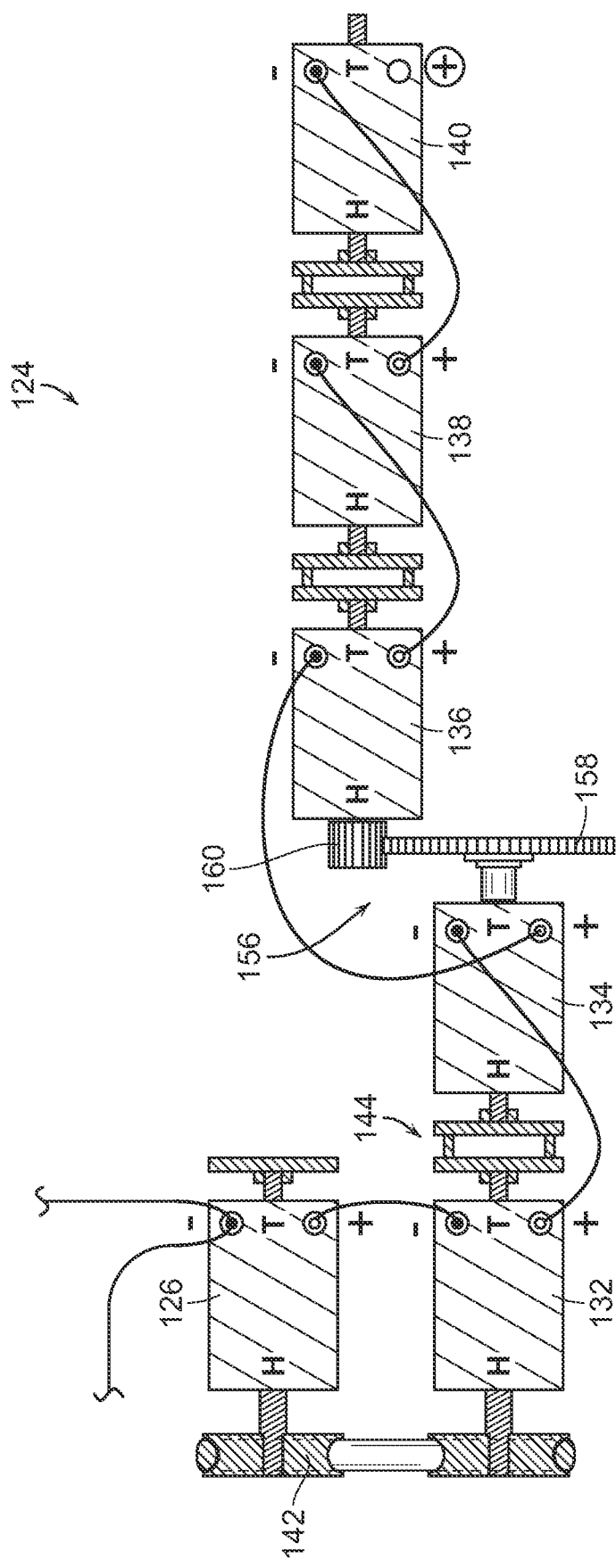
FIG. 2 is a diagrammatic view illustrating an alternative arrangement of a plurality of motors comprising an electrical generator of the system of the present invention.

With reference now to FIG. 2, the arrangement of the motors of the chain of motors could be varied and achieve the same function or purposes, or even an enhanced result. For example, instead of a flywheel assembly 134 disposed between adjacent motors, a gear assembly 156 could be used to interconnect the shafts of adjacent motors. The gear assembly 156 could comprise first and second gears 158 and 160 operably coupled to one another and their respective motor shafts. Gears 158 and 160, for example, could have a 2:1 gear ratio. Preferably, the smaller gear 160 would be attached to the head shaft and the larger gear 150 to the tail shaft of the adjacent motors. Such could serve to speed up the motors downstream of the gear assembly 156 to achieve more electrical power.

The electricity generated by the electrical generator 124 may be fed to an inverter 162 which receives direct current and inverts it to alternating current for use by one or more electrical devices 164. Outlet 166 can be used to selectively power on or off the one or more electrical devices 164.

Figure 3:
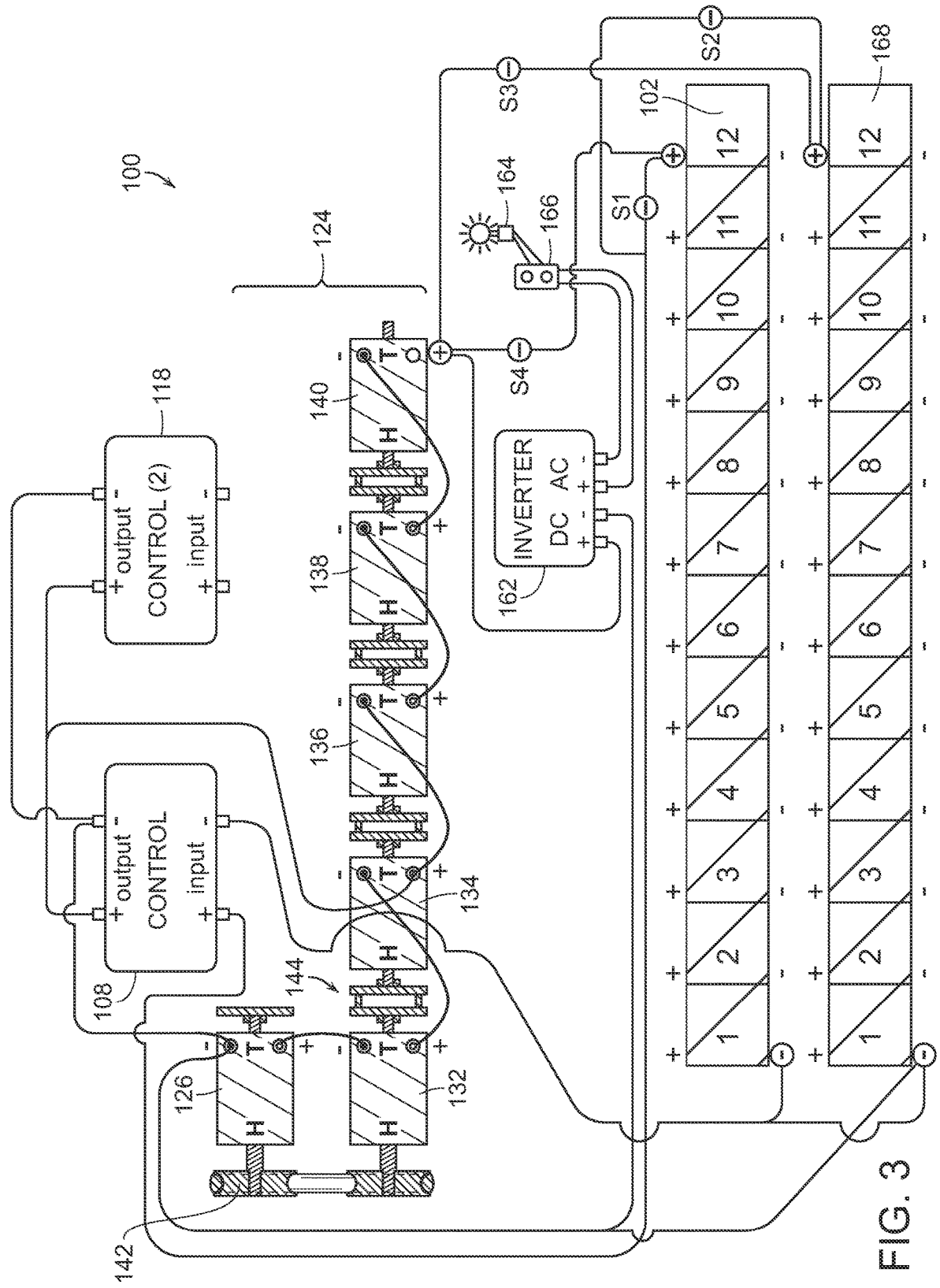
FIG. 3 is a diagrammatic view similar to FIG. 1, but also illustrating a second set of batteries, used in accordance with the present invention.

With reference now to FIG. 3, a system 100 similar to FIG. 1 is illustrated. In this embodiment, however, a second set of batteries 168 is provided. The second set of batteries 168 is similar to the first set 102, in that there are a plurality of batteries which are electrically coupled to one another in series, as shown. Once again, although there are twelve batteries illustrated in each set 102 and 168 of batteries, there could be fewer or more batteries depending upon the desire or need. It is contemplated by the present invention that one set of batteries 102 or 168 could be used to power the system 100, while the other set 102 or 168 may be used as a backup and/or recharged. Switches S1-S4 may be incorporated into the system 100 for achieving such purpose.

For example, a pair of switches interconnecting a set of batteries 102 or 168 to controller 108 could be switched off such that power is provided by the other set of batteries 102 or 168 to power the controller 108 and electrical generator 124. The other set of batteries 102 or 168 could be recharged, including using the power generated by the electrical generator 124. For example, switch S1 and switch S3 could be turned off, thus power is input into the system from the second set of batteries 168, such as through switch S2, and power output through switch S4 is input into the first set of batteries 102. In order to power the system from the first set of batteries 102 and recharge the second set of batteries 168, switches S2 and S4 would be closed and switch S1 would provide power to the system while switch S3 would provide power from the electrical generator 124 to the second set of batteries 168. Instead of routing from the electrical generator 124 to one of the sets of batteries 102 or 168, the power instead could be routed to the one or more electrical devices 164, as mentioned above.

Figure 4:
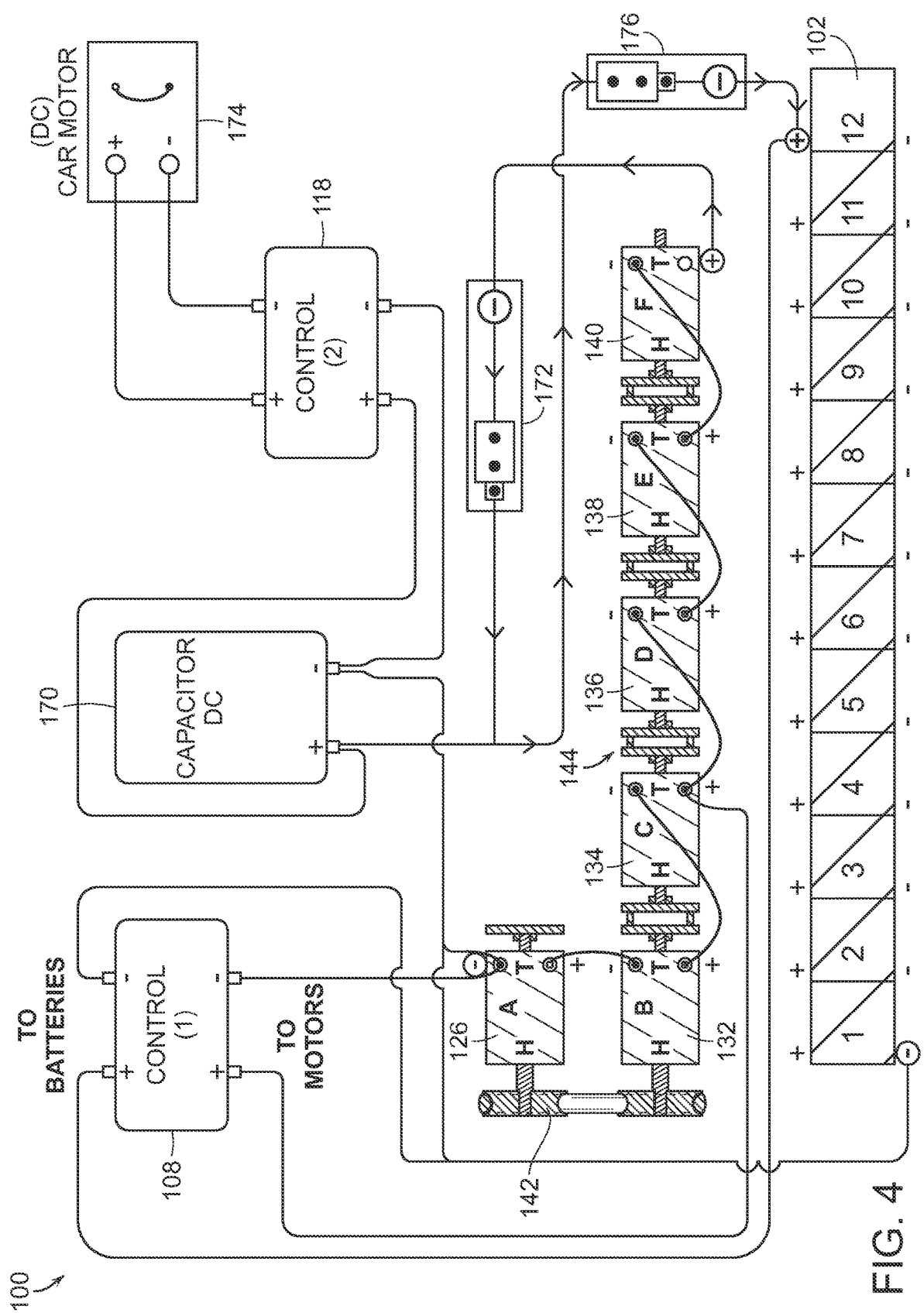
FIG. 4 is a diagrammatic view of the electrical generating system of the present invention incorporating a capacitor and coupled to a car motor, in accordance with the present invention.

With reference now to FIG. 4, an electrical generating system 100 embodying the present invention is shown which is similar to FIG. 1 illustrated above. The system 100 includes a set of batteries 102 electrically coupled to one another and the first controller 108, for powering the electric generator, comprising the plurality of motors 126-140, as described above. In this case, however, a capacitor 170 is incorporated into the system 100. The capacitor 170 is charged by means of the electricity generated from the electrical generator 124. Diode and switch 172 can be used to direct such power from the electrical generator motors into the capacitor 170. However, power from the charged capacitor 170 can be used to power an electrical device, such as a car motor 174 or even recharge the set of batteries 102, such as by actuating diode and switch 176. When diode and switch 176 is closed, the power from the capacitor 170 may be routed through the second controller 118 to the electrical device, which may comprise a DC vehicle motor 174. In such a case, the first controller 108 provides energy to the capacitor, through the electric generator 124, and the second controller 118 is used to run and operate the car motor 174. It is also contemplated by the invention that there could be leads, with switches, which would provide power from the motors of the electrical generator 126-140 to either the batteries 102 to charge the batteries or the car motor 174. The previously charged capacitor 170 could provide power to either the bank of batteries 102 to recharge them or to the car motor 174, such as when the car is running.

Figure 5:
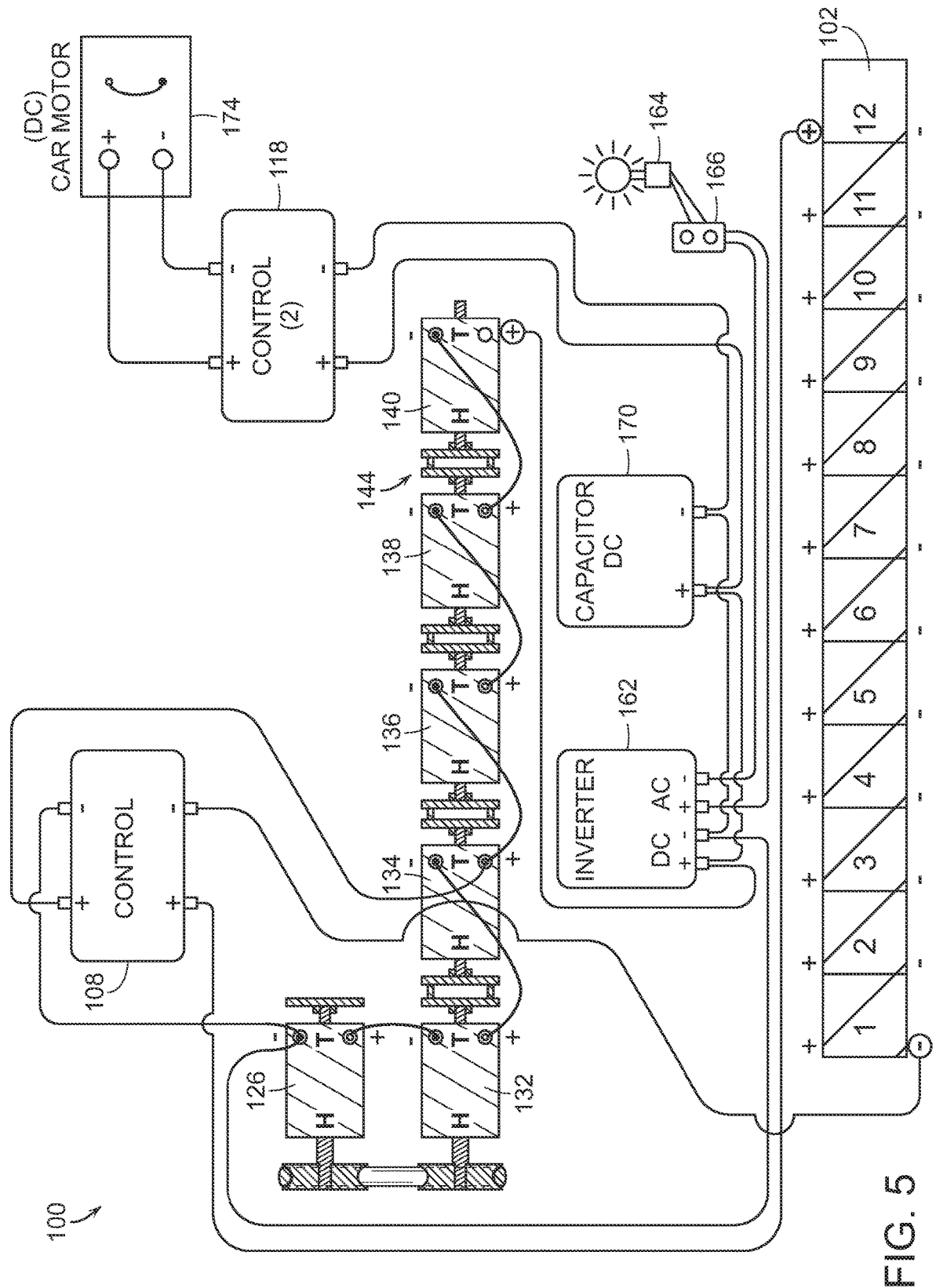
FIG. 5 is a diagrammatic view similar to FIG. 4, and incorporating an inverter.

With reference now to FIG. 5, an electrical generating system 100 embodying the present invention is shown which incorporates the components of FIGS. 1 and 4. As above, a set of plurality of batteries 102 electrically interconnected to one another, such as in series, is illustrated, provides electricity to a first controller 108, which provides electricity to a plurality of motors forming an electrical generator 124, as described above. The electrical output from the electrical generator may be directed to an inverter 162, which converts direct current to alternating current for use by one or more electrical devices 164. The power may instead be directed to the capacitor 170 for use as described above in FIG. 4. In such a case, power from the capacitor 170 may be, as needed, routed from the capacitor 170 to controller 118 to the car motor 174, such as via second controller 118. When the car motor 174 is not running or not drawing full power from the capacitor 170, the capacitor is charged by the electrical generator motors 126-140. As described above, it is contemplated by the invention that the capacitor 170 could also be used to recharge the first set of batteries 102 by providing leads between the capacitor 170 and the batteries 102, if so desired.

It will be understood that the arrangement of the chain of motors 132-140, as illustrated in FIGS. 1, and 3-5 could be of different configurations, such as in FIG. 2, where a gear assembly 156 is used instead of a flywheel assembly 144 between adjacent motors of the chain of motors. Moreover, as described above, the number of motors in the chain of motors can vary depending on the need or desire.

Figure 6:
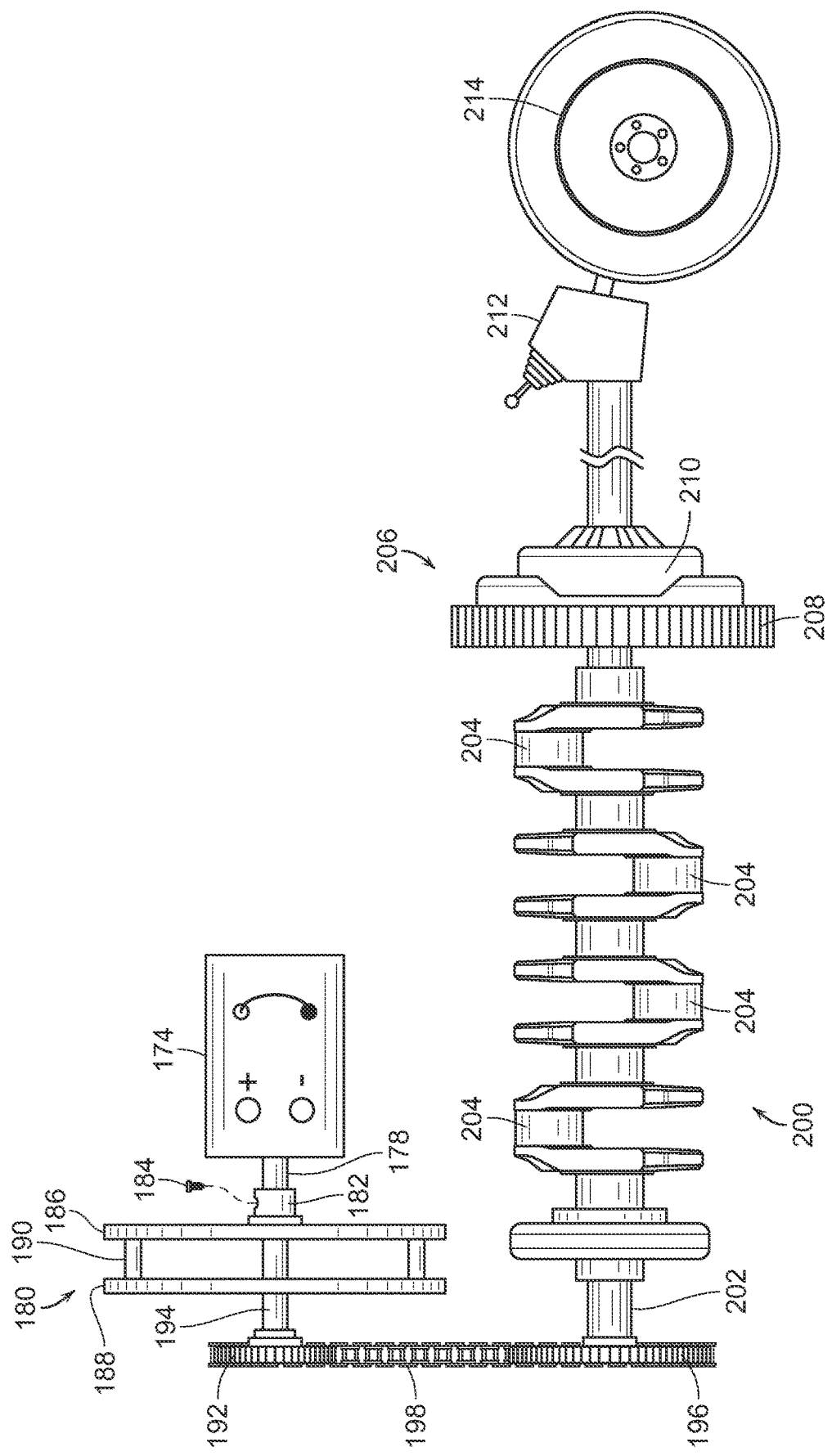
FIG. 6 is a diagrammatic view of a vehicle motor coupled to a drive train of a vehicle, in accordance with the present invention.

With reference now to FIG. 6, the electric car motor 174 may have a shaft 178 connected to a plate assembly 180 by means of a coupling 182 and a pin 184 such that as shaft 178 rotates the attached plate assembly 180 also rotates. Plate assembly 180 is comprised of two plates 186 and 188 which are interconnected to one another, such as by one or more bolts 190. A sprocket 192 of a first diameter is coupled to the plate assembly 180 by means of tube 196 or bolts which is freely rotatable with respect to shaft 194, and which sprocket 192 rotates together with plate assembly 180.

The first sprocket 192 is rotatably coupled to a second sprocket 196 of a different, and typically larger, diameter. Such rotatable coupling can be by means of a belt or chain 198. A crankshaft 200 is connected to the second sprocket 196, such as via shaft 202. The crankshaft 200 includes counterweights 204 spaced along a length of the shaft 202 and disposed at a distance from the centerline of the shaft 202, which creates leverage and torque. The degree of leverage and torque may depend upon the weight of the counterweight 204 and the distance of the counterweight 204 is from the central shaft 202. The greater the weight 204 and greater the distance the more torque and leverage is provided. The counterweights 204 are offset from one another, such as illustrated in FIG. 6.

Rotational energy and movement from the crankshaft 200 is imparted to a flywheel-clutch assembly 206, which comprises a clutch 208 and a flywheel 210. Such assembly 206 transmits the rotational energy, as desired, such as through a gearbox 212 to one or more wheels or tires 214 of the vehicle.

Although several embodiments have been described in detail for purposes of illustration, various modifications may be made without departing from the scope and spirit of the invention. Accordingly, the invention is not to be limited, except as by the appended claims.

What is claimed is:

1. An electrical generating system, comprising:
   an electrical generator comprising a first motor electrically coupled to at least one of a chain of motors, the first motor having a shaft rotatably coupled to a shaft of an end motor of the chain of motors, wherein the chain of motors comprises a plurality of motors electrically coupled in series to one another and having adjacent shafts interconnected to one another;
   a first controller having an output in electrical connection with the first motor and at least one of the motors of the chain of motors;
   a second controller electrically connected to the first controller;
   an electrical input power source comprising a first set of a plurality of batteries electrically coupled to one another in series, the electrical power source being electrically coupled to an input of the first controller; and
   an electrical device electrically coupled to an output of the electrical generator.

2. The electrical generating system of claim 1, wherein the shaft of the first motor is coupled to shaft of the end motor by a belt or chain or flywheel.

3. The electrical generating system of claim 1, including a flywheel assembly disposed between adjacent motors of the chain of motors.

4. The electrical generating system of claim 3, wherein the flywheel assembly comprises a first plate attached to a shaft of a motor and a second plate attached to a shaft of an adjacent motor, the first and second plates being interconnected.

5. The electrical generating system of claim 1, wherein a first set of motors of the chain of motors is operably connected to a second set of motors of the chain motors by a gear assembly.

6. The electrical generating system of claim 1, including an inverter that converts the dc power generated by the electrical generator into ac power for use by the electrical device.

7. The electrical generating system of claim 1, including a capacitor for storing power generated by the electrical generator.

8. The electrical generating system of claim 1, wherein the electrical input power source comprises a second set of batteries.

9. The electrical generating system of claim 8, including at least one switch electrically coupled to an output of the electrical generator for selectively directing power to recharge the first or second set of batteries.

10. The electrical generating system of claim 1, wherein the electrical device comprises an electric car motor.

11. The electrical generating system of claim 10, wherein the second controller is electrically coupled to the electric car motor.

12. The electrical generating system of claim 10, wherein the electric car motor is coupled to an interconnected plate assembly having a first sprocket of a first diameter coupled thereto, a second sprocket of a second diameter greater than the diameter of the first sprocket being coupled to the first sprocket and a rotatable crankshaft having offset counterweights extending therefrom.

13. The electrical generating system of claim 12, wherein the crankshaft is operably coupled to a flywheel-clutch assembly that imparts rotating force to at least one wheel of a car.

14. An electrical generating system, comprising:
- an electrical generator comprising a first motor electrically coupled to at least one of a chain of motors, the first motor having a shaft rotatably coupled by a belt or chain to a shaft of an end motor of the chain of motors, wherein the chain of motors comprises a plurality of motors electrically coupled in series to one another and having adjacent shafts interconnected to one another by a flywheel assembly comprising a first plate attached to a shaft of a motor and a second plate attached to a shaft of an adjacent motor, the first and second plates being interconnected;
- a first controller having an output in electrical connection with the first motor and at least one of the motors of the chain of motors;
- a second controller electrically connected to the first controller;
- an electrical input power source comprising a first set of a plurality of batteries electrically coupled to one another in series, the electrical power source being electrically coupled to an input of the first controller;
- an electrical device electrically coupled to an output of the electrical generator.

15. The electrical generating system of claim 14, including an inverter that converts the dc power generated by the electrical generator into ac power for use by the electrical device.

16. The electrical generating system of claim 14, including a capacitor for storing power generated by the electrical generator.

17. The electrical generating system of claim 14, wherein the electrical input power source comprises a second set of batteries, and including at least one switch electrically coupled to an output of the electrical generator for selectively directing power to recharge the first or second set of batteries.

18. The electrical generating system of claim 14, wherein a first set of motors of the chain of motors is operably connected to a second set of motors of the chain motors by a gear assembly.

19. The electrical generating system of claim 14, wherein the electrical device comprises an electric car motor.

20. The electrical generating system of claim 19, wherein the second controller is electrically coupled to the electric car motor.

21. The electrical generating system of claim 19, wherein the electric car motor is coupled to an interconnected plate assembly having a first sprocket of a first diameter coupled thereto, a second sprocket of a second diameter greater than the diameter of the first sprocket being coupled to the first sprocket and a rotatable crankshaft having offset counterweights extending therefrom, and wherein the crankshaft is operably coupled to a flywheel-clutch assembly that imparts rotating force to at least one wheel of a car.

* * * * *